United States Patent
Koizumi et al.

(10) Patent No.: US 8,310,688 B2
(45) Date of Patent: Nov. 13, 2012

(54) IMAGE FORMING APPARATUS, IMAGE FORMING METHOD, AND IMAGE FORMING PROGRAM STORAGE MEDIUM

(75) Inventors: Kenji Koizumi, Kanagawa (JP); Yasuhiro Arai, Kanagawa (JP); Masaki Fujise, Kanagawa (JP); Hayato Yoshikawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 605 days.

(21) Appl. No.: 12/561,874

(22) Filed: Sep. 17, 2009

(65) Prior Publication Data

US 2010/0202012 A1 Aug. 12, 2010

(30) Foreign Application Priority Data

Feb. 6, 2009 (JP) ................. 2009-026251

(51) Int. Cl.
*G06F 15/00* (2006.01)
*G06K 1/00* (2006.01)
(52) U.S. Cl. ......................................... 358/1.1; 358/1.2

(58) Field of Classification Search .................. None
See application file for complete search history.

(56) References Cited

FOREIGN PATENT DOCUMENTS

| JP | 11-123848 A | 5/1999 |
|---|---|---|
| JP | 2005-236861 A | 9/2005 |
| JP | 3697039 B2 | 9/2005 |
| JP | 2006-267168 A | 10/2006 |

*Primary Examiner* — Thierry Pham
(74) *Attorney, Agent, or Firm* — Sughrue Mion, PLLC

(57) ABSTRACT

A set value output circuit includes a first output unit and a second output unit. The first output unit outputs a signal input to a first input when a first timing signal is input to a second input, and continues to output the signal until a next first timing signal is input. The second output unit outputs the signal input to a third input when the second timing signal is input to a fourth input, and continues to output the signal until a next second timing signal is input. A selection unit inputs a selected timing signal as the second timing signal to the fourth input. A control unit inputs the first timing signal to the second input, so that a set value for an image to be formed next is output during image formation using the signal output from the second output.

8 Claims, 7 Drawing Sheets

IMAGE FORMING APPARATUS, IMAGE FORMING METHOD, AND IMAGE FORMING PROGRAM STORAGE MEDIUM

CROSS-REFERENCE TO RELATED APPLICATIONS

This application is based on and claims priority under 35 USC 119 from Japanese Patent Application No. 2009-026251 filed on Feb. 6, 2009.

BACKGROUND

1. Technical Field

The present invention relates to an image forming apparatus, image forming method, and an image forming program storage medium.

2. Related Art

There have been image forming apparatuses that are capable of switching set values for image formation in predetermined timing.

SUMMARY

An aspect of the present invention is an image forming apparatus that includes: a set value output circuit that includes: a first output unit that has a first input unit to which a signal indicating a set value for forming an image based on image data is sequentially input and a second input unit to which a first timing signal is input, the first output unit outputting the signal input to the first input unit when the first timing signal is input to the second input unit, and continuing to output the signal until a next first timing signal is input to the second input unit; and a second output unit that has a third input unit to which the signal output from the first output unit is input and a fourth input unit to which a second timing signal is input, the second output unit outputting the signal input to the third input unit when the second timing signal is input to the fourth input unit, and continuing to output the signal until a next second timing signal is input to the fourth input unit; a selection unit that selects one of plural timing signals that are output in accordance with an image formation operation, and inputs the selected timing signal as the second timing signal to the fourth input unit of the second output unit; and a control unit that inputs the first timing signal to the second input unit of the first output unit, so that a set value for an image to be formed next is output during image formation using the signal output from the second output unit.

BRIEF DESCRIPTION OF THE DRAWINGS

Exemplary embodiments of the present invention will be described in detail based on the following figures, wherein.

DETAILED DESCRIPTION

A description of exemplary embodiments of the present invention is given below with reference to the accompanying drawings. In the exemplary embodiments, a multi-function device having various functions such as a copy, printer and the like is taken as an example.

Figure 1:
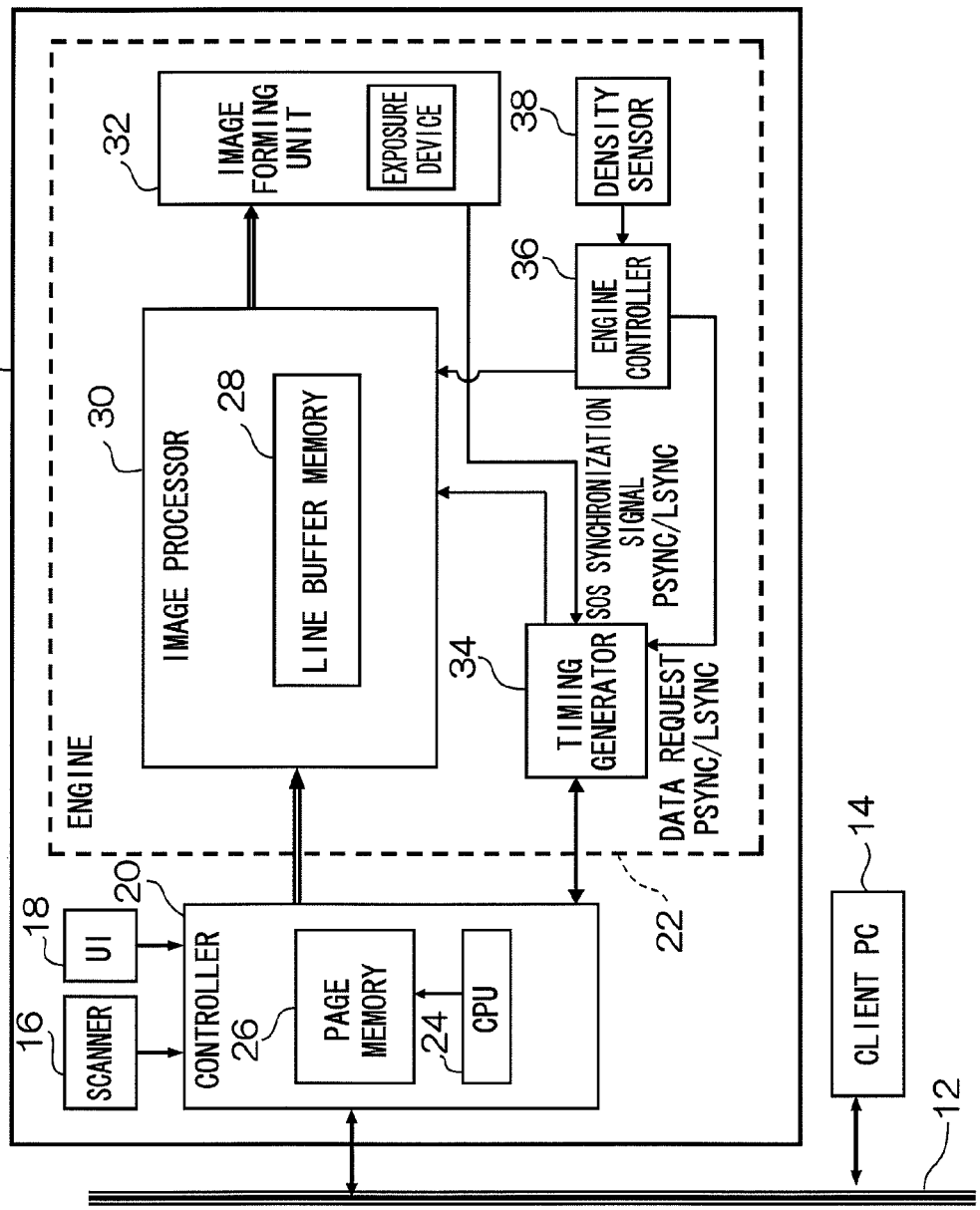
FIG. 1 is a schematic view of an entire system that includes an image forming apparatus in accordance with exemplary embodiments.

FIG. 1 is a diagram showing an environment in which an image forming apparatus 10 according to a first exemplary embodiment is used. The image forming apparatus 10 is connected to a network 12, and a client PC 14 is also connected to the network 12.

The image forming apparatus 10 includes: a scanner 16 that reads a document to be printed; a user interface (UI) 18 that is formed with a touch panel display or the like for inputting instructions from a user to the image forming apparatus 10, and reporting the user of information sent from the image forming apparatus 10; a controller 20 that performs predetermined processing on input image data, and outputs the processed image data; and an engine 22 that forms an image based on the image data output from the controller 20. Although the controller 20 and the engine 22 are integrally formed in the image forming apparatus 10 of the exemplary embodiment, the controller 20 and the engine 22 may be physically independent of each other.

The controller 20 may be formed with a microcomputer that includes: a CPU 24 that controls the entire image processing apparatus 10; a ROM (not shown) that stores in advance various programs, various parameters, various table information, and the likes; a RAM (not shown) that is used as a work area when the CPU 24 executes one of the various programs; a page memory 26 that stores image data obtained through image reading; and a bus that mutually connects these components.

The controller 20 performs color space transformations, gradation conversions, format conversions, compressing/expanding, and the likes on input data (PDL) from the client PC 14 connected via the network 12, and/or image data that is read with the scanner 16. After storing these data into the page memory 26, the controller 20 outputs the image data in units of line to the engine 22, in synchronization with a page synchronization signal Psync and a line synchronization signal Lsync supplied from the engine 22.

The engine 22 includes: an image processor 30 that includes a line buffer memory 28, and performs image processing such as dither processing and/or error diffusion processing on the image data that is output from the controller 20; an image forming unit 32 that forms an image based on the image data subjected to the predetermined processing; a timing generator 34 that generates and outputs various timing signals; an engine controller 36 that controls components of the engine 22; and a density sensor 38 that performs density calibration.

The image forming unit 32 is a so-called tandem-type electrophotographic image forming unit that includes: rotating photoreceptors of the respective colors of yellow (Y), magenta (M), cyan (C), and black (K); an exposure device that forms an electrostatic latent image on each of the photoreceptors; a developing device that develops the electrostatic latent images into toner images; an intermediate transfer belt onto which the developed toner image of each color is transferred; and a fixing unit that fixes the toner images from the intermediate transfer belt onto a paper sheet. First, based on image data that is read in synchronization with a timing signal generated at the timing generator 34, the image forming unit 32 forms an electrostatic latent image on the surface of each photoreceptor with the exposure device using an LED array or laser beams. The formed electrostatic latent images are developed into toner images by the developing devices, and the toner images of each the colors are sequentially transferred onto the intermediate transfer medium. While the intermediate transfer belt rotates through one cycle, a full-color image is formed. The full-color image transferred onto the intermediate transfer belt is then transferred and fixed onto a paper sheet of a predetermined size transported thereat, and an image is formed on the paper sheet.

Based on detection signals from various sensors, the timing generator 34 generates and outputs a page synchronization signal Psync (sub-scan reference signal) that is a synchronization signal for each one page of image data and indicates start of each image formation, a line synchronization signal Lsync (main-scan reference signal) that is a synchronization signal for each one line of image data and corresponds to a synchronization signal (SOS) supplied from the exposure device, and a rotation cycle reference signal Encode-RST that indicates the rotation cycle of each photoreceptor.

The density sensor 38 performs a density calibration process in order to keep uniform density in images to be formed to reduce the influence of changes in the device with time on the images. In a regular density calibration process, a density patch (an image used for density detection) is generated at a position such as between two page images on a paper sheet, and density data thereof is detected. Based on the detected density data, density correction data is generated. In a high-precision density calibration process, a half-tone image is output on an entire print area, and the density unevenness corresponding to one cycle of the photoreceptors is detected. Density correction data is then generated for each region formed by dividing the print area in sub-scanning direction.

The image processor 30 includes plural set value output circuits that output set values for adjusting the amount of light to be emitted from the exposure device, based on the image data subjected to the image processings such as dither processing and/or error diffusion processing, and the image correction data generated by the density sensor 38.

Figure 2:
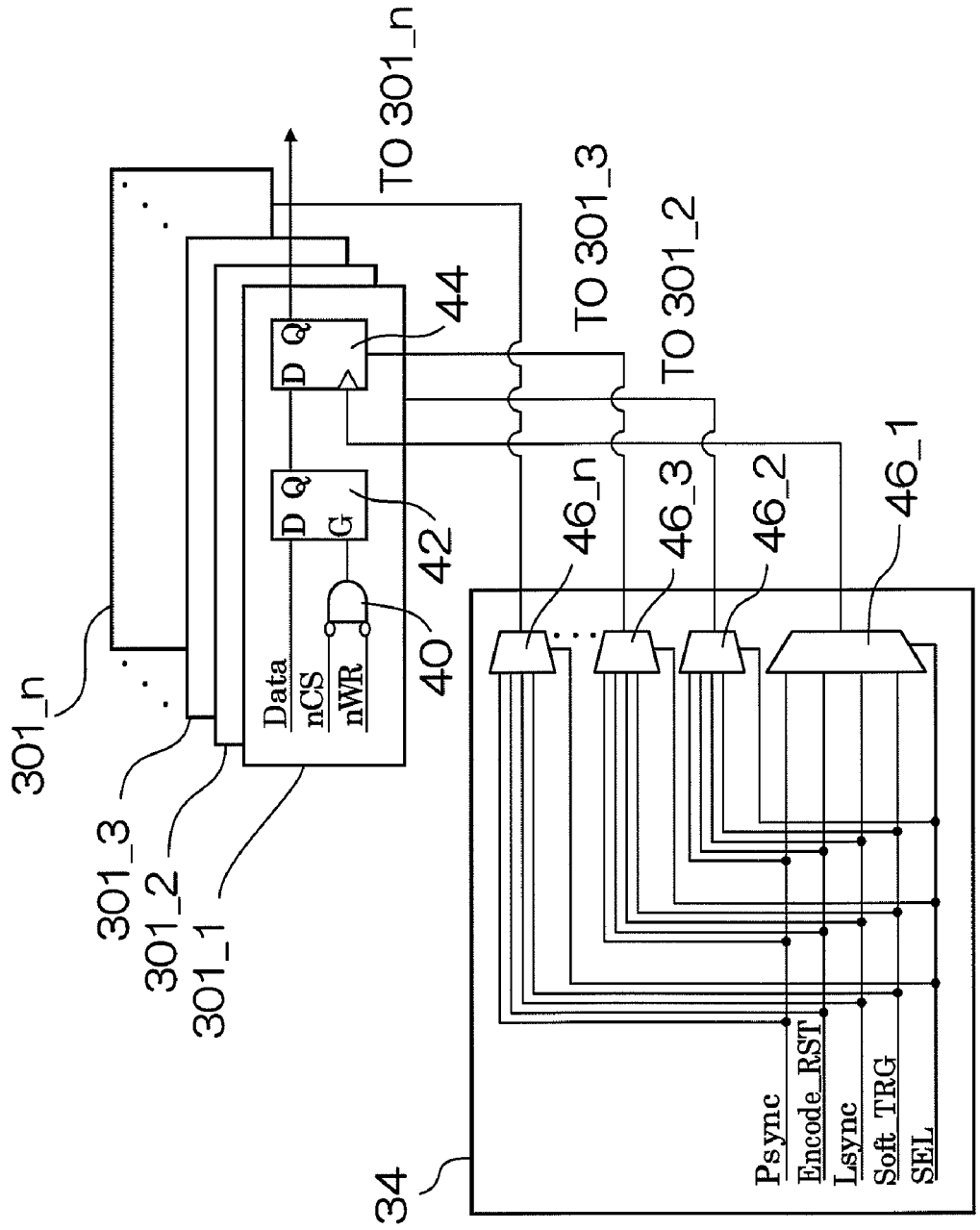
FIG. 2 is a schematic view illustrating a structure relating to set value output circuits and selection circuits in the image forming apparatus in accordance with a first exemplary embodiment.

As shown in FIG. 2, each of the set value output circuits 301_1 through 301_n includes: an AND circuit 40 to which a write signal nWR and a chip selection signal nCS are input from the CPU 24; a first D (delay) flip-flop (D-FF) 42 that has a D-terminal to which a signal indicating a set value is input, and a G-terminal to which a signal output from the AND circuit 40 is input; and a second D-FF 44 that has a D-terminal to which a signal output from the first D-FF 42 is input, and a clock terminal to which a timing signal selected by a selection circuit 46, which is later described, is input.

When the signal output from the AND circuit 40 (hereinafter referred to as the first timing signal) is input to the G-terminal, the first D-FF 42 outputs the signal indicating the set value, which has been input to the D-terminal, from the Q-terminal, and maintains the output state (the outputting of the signal) until the next first timing signal is input to the G-terminal. When the signal output from the selection circuit 46 is input to the clock terminal (hereinafter referred to as the second timing signal), the second D-FF 44 outputs the signal, which has been input to the D-terminal from the first D-FF 42, from the Q-terminal, and maintains the output state (the outputting of the signal) until the next second timing signal is input to the clock terminal. The signal output from the Q-terminal of the second D-FF 44 corresponds to the signal indicating the set value for adjusting an amount of light to be emitted from the exposure device. That is, the set value is updated at the time when the second timing signal is input to the clock terminal of the second D-FF 44.

The selection circuits 46_1 through 46_n are provided for the respective set value output circuits 301_1 through 301_n, and each of the selection circuits selects and outputs a timing signal suitable for the operation mode for image formation among the plural timing signals generated by the timing generator 34. Here, example operation modes include a monochrome or high-speed mode, a normal mode, and a high-quality mode. An operation mode may be selected by a user through the UI 18 or the client PC 14.

Figure 3:
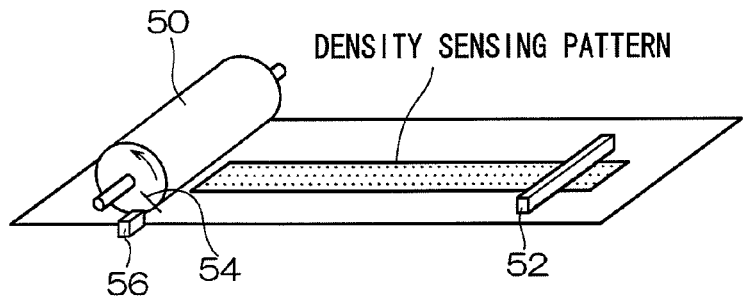
FIG. 3 is a schematic view for explaining density unevenness (variation) depending on the rotational position of a photoreceptor.
Figure 4:
FIG. 4 is a diagram showing the density unevenness (variation) depending on the rotation cycle of a photoreceptor.

Referring now to FIGS. 3 and 4, density unevenness that depends on the rotational positions of the photoreceptors is described.

As shown in FIG. 3, a density sensing pattern corresponding to one rotation of a photoreceptor 50 is output, and the density thereof is detected with a density detection sensor 52. Each one rotation of the photoreceptor 50 can be sensed by detecting a reference position mark 54 formed on a side surface of the photoreceptor 50 with an optical sensor 56 or the like. Based on this detection signal, the rotation cycle reference signal Encode-RST is generated as a timing signal. For example, in a case in which the density unevenness shown in FIG. 4 is detected, since the rotation cycle reference signal Encode-RST is not in synchronization with the page synchronization signal Psync, high-precision density calibration cannot be performed by generating page-based density correction data for the density unevenness.

Therefore, when the monochrome or high-speed mode is selected as the operation mode, the selection circuit 46 selects the page synchronization signal Psync as the second timing signal, so that the simplest light amount control is performed. When the normal mode is selected as the operation mode, the selection circuit 46 selects the rotation cycle reference signal Encode-RST as the second timing signal, so that light amount control is performed using the high-precision density calibration. When the high-quality mode is selected as the operation mode, the selection circuit 46 selects the line synchronization signal Lsync as the second timing signal, so that more precise processing is performed using the high-precision density calibration.

Next, specific operations performed in the respective operation modes are described. Note that in the following description regarding the present embodiment, an operation of one combination of the set value output circuit 301 and the corresponding selection circuit 46 will be explained as an example. All other combinations operate in the same manner.

Figure 5:
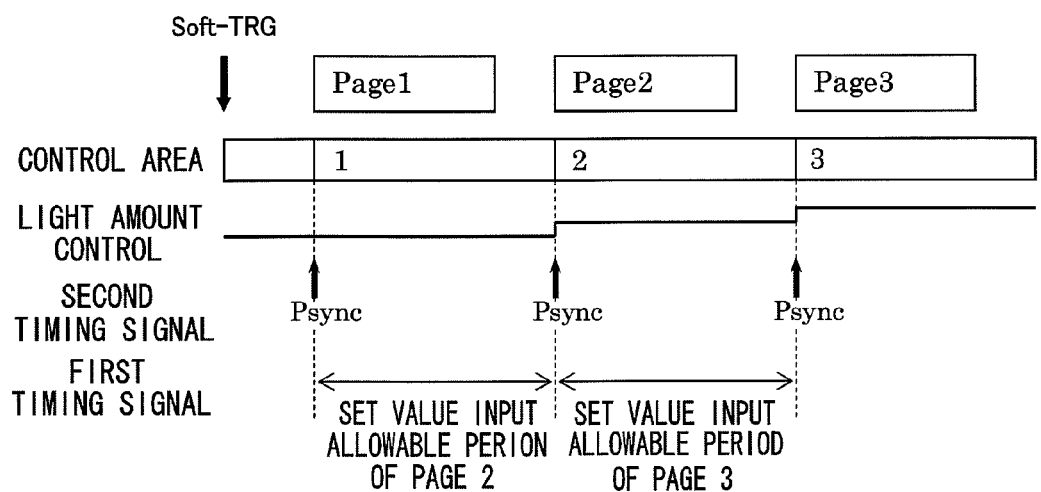
FIG. 5 is a diagram for explaining an operation performed in a monochrome or high-speed mode in the first exemplary embodiment.

In the monochrome or high-speed mode, the amount of light is fixed for each page, and light amount control is performed by gradually increasing the amount of light in synchronization with the page synchronization signal Psync, as shown in FIG. 5.

When the monochrome or high-speed mode is selected as the operation mode through the client PC 14 or the UI 18, the CPU 24 outputs a selection signal SEL1 to inform the selection circuit 46 to that effect. The CPU 24 further inputs a signal indicating the set value of the first page to the D-terminal of the first D-FF 42, and inputs the write signal nWR and the chip selection signal nCS for the set value output circuit 301 to the AND circuit 40. When the first timing signal output from the AND circuit 40 is input to the G-terminal of the first D-FF 42, the signal indicating the set value for the first page is output from the Q-terminal of the first D-FF 42, and is input to the D-terminal of the second D-FF 44. On the other hand, in accordance with the selection signal SEL1, the selection circuit 46 switches the second timing signal to the page synchronization signal Psync, which is to be selected and output. When the first page synchronization signal Psync is input as the second timing signal to the clock terminal of the second D-FF 44, the signal indicating the set value for the first page, which is input to the D-terminal of the second D-FF 44, is output from the Q-terminal thereof. Based on the output set value, the amount of light is controlled, and the first-page image formation is performed.

While the amount of light is controlled based on the signal indicating the set value output from the Q-terminal of the second D-FF 44 and the first-page image formation is performed, the CPU 24 inputs a signal indicating the set value for the second page to the D-terminal of the first D-FF 42, and inputs the first timing signal to the G-terminal of the first D-FF 42. As a result, the signal indicating the set value for the second page is output from the Q-terminal of the first D-FF 42, and is input to the D-terminal of the second D-FF 44. When the next page synchronization signal Psync is generated and is input as the second timing signal to the clock terminal of the second D-FF 44, the signal indicating the set value for the second page input from the D-terminal of the second D-FF 44 is output from the Q-terminal thereof. Based on the output set value, the amount of light is controlled, and the second-page image formation is performed. The same operation as above is performed for the third page, and the subsequent pages.

Figure 6:
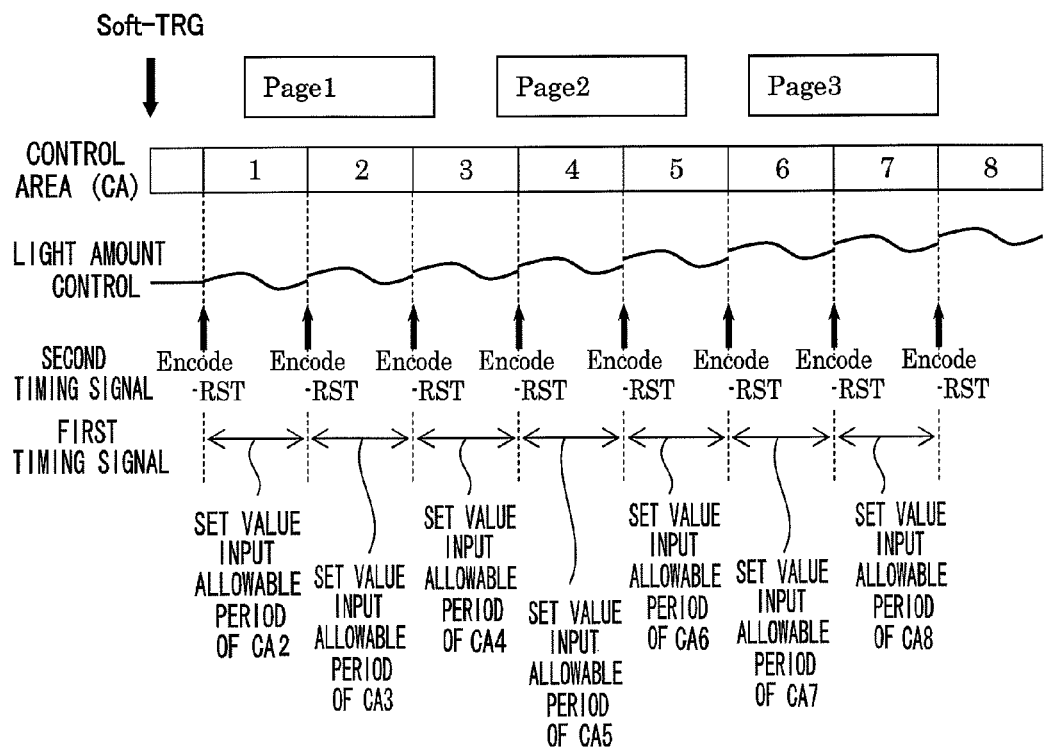
FIG. 6 is a diagram for explaining an operation performed in a normal mode in the first exemplary embodiment.

In the normal mode, as shown in FIG. 6, light amount controlling is performed based on density correction data for performing high-precision density calibration in an area (a control area) corresponding to one rotation of the photoreceptor 50, and the amount of light is also gradually increased every time the photoreceptor 50 rotates through one rotation, i.e., in synchronization with the rotation cycle reference signal Encode-RST.

That is, when the normal mode is selected as the operation mode through the client PC 14 or the UI 18, the CPU 24 outputs a selection signal SEL2 to inform the selection circuit 46 to that effect. The CPU 24 further inputs a signal indicating the set value for a first control area (control area 1) to the D-terminal of the first D-FF 42, and inputs the write signal nWR and the chip selection signal nCS for the set value output circuit 301 to the AND circuit 40. When the first timing signal output from the AND circuit 40 is input to the G-terminal of the corresponding first D-FF 42, the signal indicating the set value for the control area 1 is output from the Q-terminal of the first D-FF 42 and is input to the D-terminal of the second D-FF 44. Meanwhile, in accordance with the selection signal SEL2, the selection circuit 46 switches the second timing signal to the rotation cycle reference signal Encode-RST, which is to be selected and output. When the first rotation cycle reference signal Encode-RST is input as the second timing signal to the clock terminal of the second D-FF 44, the signal indicating the set value for the control area 1, which is input to the D-terminal of the second D-FF 44, is output from the Q-terminal thereof. Based on the output set value, the amount of light is controlled, and image formation of the control area 1 is performed.

While the controlling of the light amount based on the signal indicating the set value output from the Q-terminal of each second D-FF 44, and the image formation for the control area 1 is performed, the CPU 24 inputs a signal indicating the set value for a second control area (control area 2) to the D-terminal of the first D-FF 42, and inputs the first timing signal to the G-terminal of the first D-FF 42. As a result, the signal indicating the set value for the control area 2 is output from the Q-terminal of the first D-FF 42, and is input to the D-terminal of the second D-FF 44. When the next rotation cycle reference signal Encode-RST is generated and is input as the second timing signal to the clock terminal of the second D-FF 44, the signal indicating the set value for the control area 2, which is input to the D-terminal of the second D-FF 44, is output from the Q-terminal thereof. Based on the output set value, the amount of light is controlled, and image formation of the control area 2 is performed. The same operation as above is performed for the third control area (control area 3), and the subsequent control areas.

Figure 7:
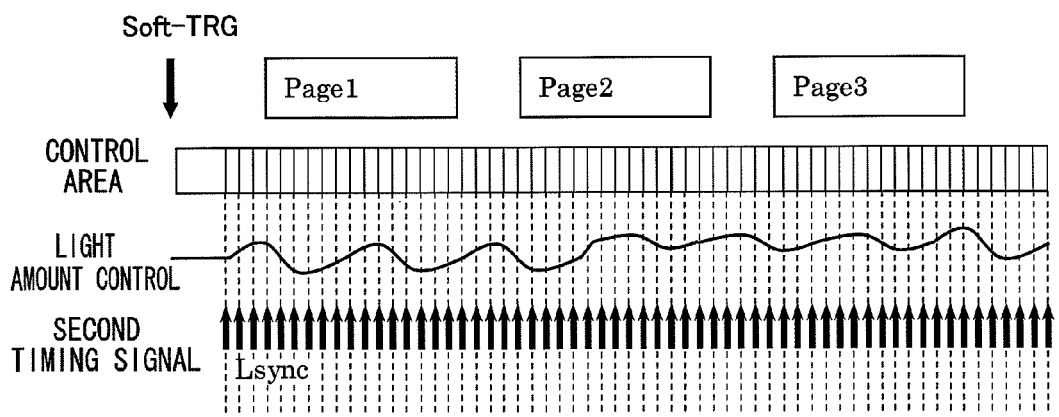
FIG. 7 is a diagram for explaining an operation performed in a high-quality mode in the first exemplary embodiment.

In the high-quality mode, as shown in FIG. 7, the amount of light is controlled for each line, in synchronization with the line synchronization signal Lsync. For example, the amount of light may be controlled in units of each main-scan line, based on density correction data generated by combining high-precision density correction data corresponding to the rotation cycle and density correction data in units of page. The operation performed in the high-quality mode is the same as the operation in the normal mode, except that the second timing signal is the line synchronization signal Lsync, and the control areas are set in units of the main-scan lines. Although the input allowable period for the first timing signal is not shown in FIG. 7, the set value for the second line is input to the D-terminal of the first D-FF 42 during image formation of the first-line.

Figure 8:
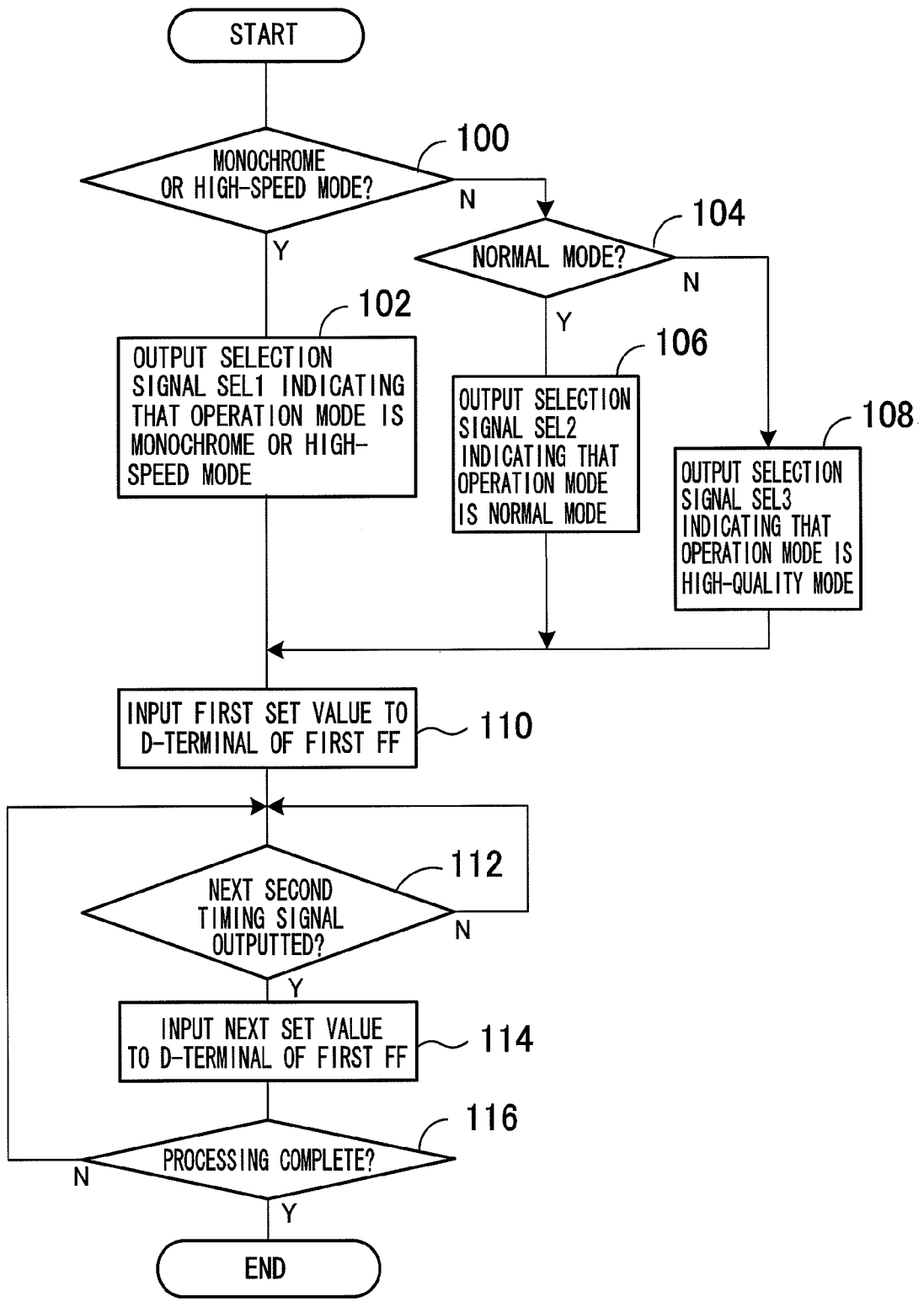
FIG. 8 is a flowchart of an image forming routine according to the first exemplary embodiment.

Referring now to FIG. 8, image forming program executed by the CPU 24 of the controller 20 is described. This routine starts when image data transferred from a client PC or image data read by the scanner 16 is input to the controller 20.

In step 100, it is determined whether or not the operation mode selected by a user through the client PC 14 or the UI 18 is the monochrome or high-speed mode. If the selected operation mode is the monochrome or high-speed mode, the operation moves to step 102, and the selection signal SEL1 indicating that the operation mode is the monochrome or high-speed mode is output to the selection circuits 46. If the selected operation mode is not the monochrome or high-speed mode, the operation moves to step 104, and it is determined whether or not the operation mode selected by the user through the client PC 14 or the UI 18 is the normal mode. If the selected operation mode is the normal mode, the operation moves to step 106, and the selection signal SEL2 indicating that the operation mode is the normal mode is output to the selection circuits 46. If the selected operation mode is not the normal mode, the operation mode is determined to be the high-quality mode, the operation moves to step 108, and the selection signal SEL3 indicating that the operation mode is the high-quality mode is then output to the selection circuits 46.

In step 110, the signal indicating the first set value is input to the D-terminal of the first D-FF 42, and the write signal nWR and the chip selection signal nCS for the set value output circuits 301 are input to the AND circuit 40.

In step 112, the signal output from the selection circuit 46 is monitored and it is determined whether or not the second timing signal is output. Here, when the selection signal SEL1 indicating that the operation mode is the monochrome or high-speed mode is output to the selection circuit 46 in step 102, the second timing signal output from the selection circuit 46 is the page synchronization signal Psync. When the selection signal SEL2 indicating that the operation mode is the normal mode is output to the selection circuit 46 in step 106, the second timing signal output from the selection circuit 46 is the rotation cycle reference signal Encode-RST. When the selection signal SEL3 indicating that the operation mode is the high-quality mode is output to the selection circuit 46 in step 108, the second timing signal output from the selection circuit 46 is the line synchronization signal Lsync. When the second timing signal is output, the operation moves to step 114. If the second timing signal is not output, the determination procedure of step 112 is repeated until the second timing signal is output.

In step 114, the signal indicating the next set value is input to the D-terminal of the first D-FF 42, and the write signal nWR and the chip selection signal nCS for the set value output circuits 301 are input to the AND circuit 40.

In step 116, it is determined whether or not the processing has been completed for all input image data. If it is determined that the processing has not been completed, the operation returns to step 112, in which it is determined whether or not the second timing signal is output, and the subsequent procedures are repeated. If it is determined that the processing for all image data have been completed, the routine is ended.

As described above, in the image forming apparatus according to the first exemplary embodiment, when a timing signal selected from several timing signals is input to the second D-FF, the set value for image formation can be switched. Accordingly, the timing for switching the set value may be flexibly selected in accordance with the operation mode.

In the first exemplary embodiment, the second timing signal is set to be the page synchronization signal Psync in the monochrome or high-speed mode, the rotation cycle reference signal Encode-RST in the normal mode, and the line synchronization signal Lsync in the high-quality mode. However, embodiments are not limited to this and the second timing signal may be any kind of timing signal which can be selected in accordance with the light amount control to be performed.

Next, a second exemplary embodiment is described. The second exemplary embodiment differs from the first exemplary embodiment in that the same second timing signal output from one selection circuit is input to the plural second D-FFs.

Figure 9:
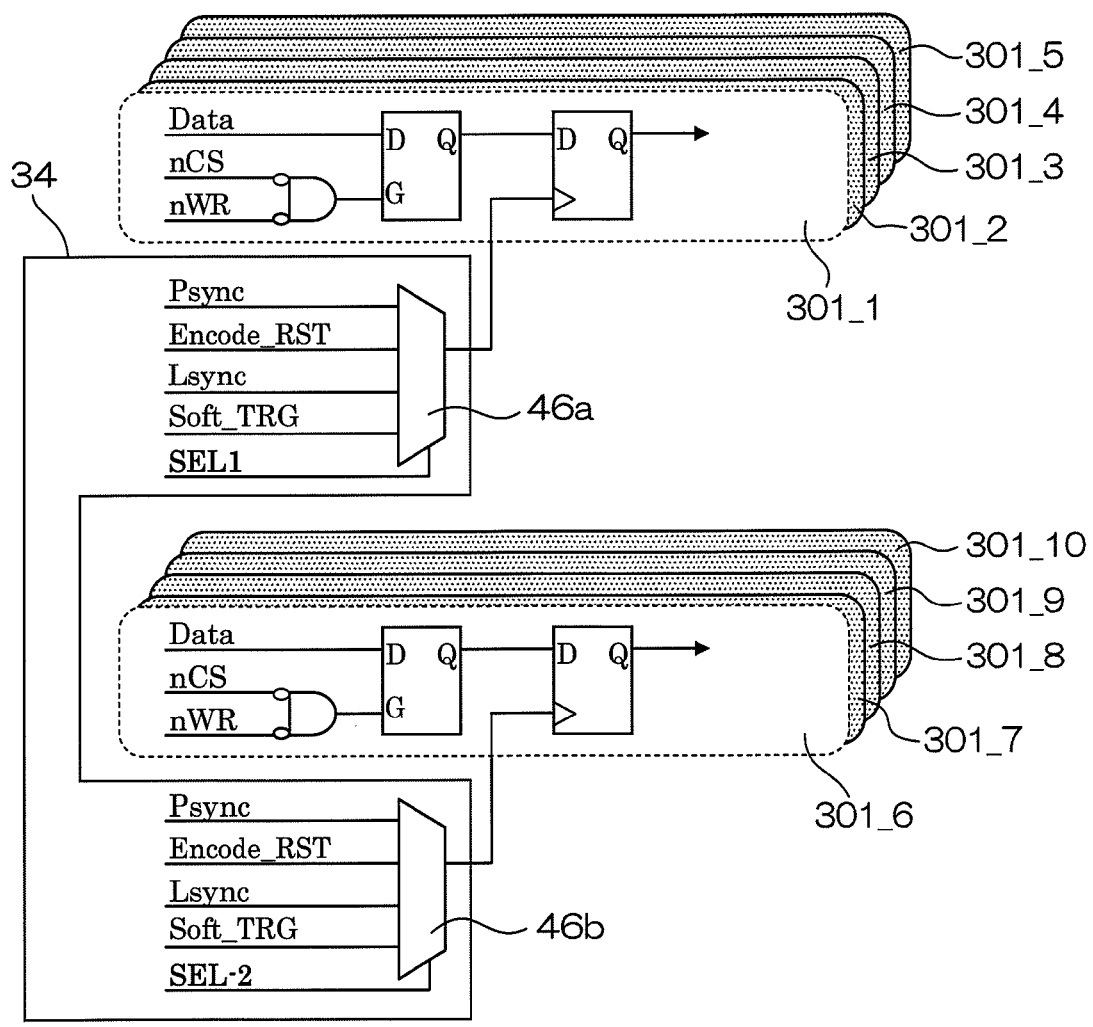
FIG. 9 is a schematic view showing a structure relating to set value output circuits and selection circuits in an image forming apparatus according to a second exemplary embodiment.

As shown in FIG. 9, in the image forming apparatus 10 according to the second exemplary embodiment, the image processor 30 includes plural set value output circuits 301_1 through 301_10. The image forming apparatus 10 also included in the timing generator 34 selection circuits 46*a* and 46*b*. The second timing signal that is output from the selection circuit 46*a* is input to each of the clock terminals of the second D-FFs 44 of the set value output circuits 301_1 through 301_5. The second timing signal that is output from the selection circuit 46*b* is input to each of the clock terminals of the second D-FFs 44 of the set value output circuits 301_6 through 301_10.

Accordingly, the set value output circuits 301_1 through 301_5 is simultaneously switch the set value to be output,
based on the second timing signal selected by the selection circuit 46*a*. Likewise, the set value output circuits 301_6 through 301_10 is simultaneously switch the set value to be output, based on the second timing signal selected by the selection circuit 46*b*.

As described above, in the image forming apparatus according to the second exemplary embodiment, the second timing signal selected by one select circuit is input to a group of the set value output circuits that simultaneously switch the set value to be output. Accordingly, the circuit structure may be simplified.

Next, a third exemplary embodiment is described. The third exemplary embodiment differs from the first exemplary embodiment in that a combination of plural timing signals is used as a timing signal.

Figure 10:
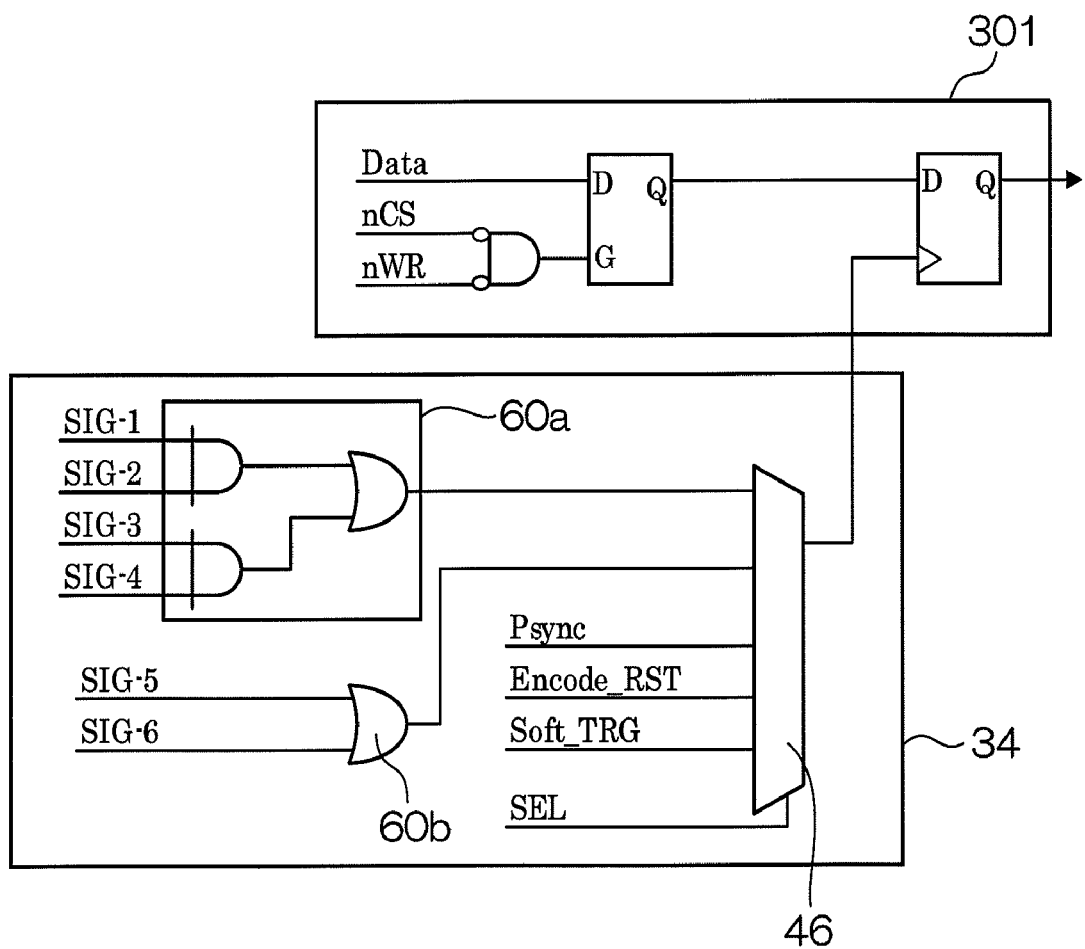
FIG. 10 is a schematic view showing a structure relating to a set value output circuit and a selection circuit in an image forming apparatus according to a third exemplary embodiment.

As shown in FIG. 10, in the image forming apparatus 10 according to the third exemplary embodiment, the timing generator 34 includes a combining circuit 60*a* that combines timing signals SIG-1 through SIG-4 into one timing signal, and a combining circuit 60*b* that combines timing signals SIG-5 and SIG-6 into one timing signal.

For example, given that the timing signal SIG-5 is a soft register setting signal Soft-TRG generated by the CPU 24, and the timing signal SIG-6 is a page synchronization signal Psync. When the monochrome or high-speed mode described in the first exemplary embodiment is selected as the operation mode, the selection circuit 46 selects the timing signal to be output from the combining circuit 60*b*, and inputs the timing signal to the clock terminal of the second D-FF 44. By outputting the soft register setting signal Soft-TRG before the first page synchronization signal Psync is output, the second timing signal is input at the timing of "Soft-TRG" shown in FIG. 5. As a result, as for the set values for the second page and the subsequent pages, the set value for the first page can be set without taking into consideration the inter-image periods.

Further, by providing a combining circuit that outputs a timing signal generated by combining the soft register setting signal Soft-TRG and the rotation cycle reference signal Encode-RST, and a combining circuit that outputs a timing signal generated by combining the soft register setting signal Soft-TRG and the line synchronization signal Lsync, even in the normal mode and the high-quality mode described in the first exemplary embodiment, the set value for the first control area (control area 1) or for the first line can also be set without taking into consideration the inter-image periods.

As described above, in the image forming apparatus according to the third exemplary embodiment, the timing signal selected as the second timing signal may be flexibly generated. Accordingly, selection of the timing for switching the set value to be output may be more flexible.

In the above exemplary embodiment, a case in which the page synchronization signal Psync, the line synchronization signal Lsync, the rotation cycle reference signal Encode-RST, and the soft register setting signal Soft-TRG are used as the timing signal. However, any other timing signals such as the rotation cycle reference signals of the other rotating members in the image forming unit may be used.

What is claimed is:

1. An image forming apparatus comprising:
   a set value output circuit that includes:
   a first output unit that has a first input unit to which a signal indicating a set value for forming an image based on image data is sequentially input and a second input unit to which a first timing signal is input, the first output unit outputting the signal input to the first input unit when the first timing signal is input to the second input unit, and continuing to output the signal until a next first timing signal is input to the second input unit; and a second output unit that has a third input unit to which the signal output from the first output unit is input and a fourth input unit to which a second timing signal is input, the second output unit outputting the signal input to the third input unit when the second timing signal is input to the fourth input unit, and continuing to output the signal until a next second timing signal is input to the fourth input unit;

a selection unit that selects one of a plurality of timing signals that are output in accordance with an image formation operation, and inputs the selected timing signal as the second timing signal to the fourth input unit of the second output unit; and a control unit that inputs the first timing signal to the second input unit of the first output unit, so that a set value for an image to be formed next is output during image formation using the signal output from the second output unit.

2. The image forming apparatus of claim 1, wherein the plurality of timing signals comprise at least two signals selected from a main scan reference signal that is a synchronization signal in units of one line of the image data, a sub scan reference signal that is a synchronization signal in units of one page of the image data, or a rotation cycle reference signal that is generated at every one rotation of a photosensitive drum used for the image formation.

3. The image forming apparatus of claim 1, further comprising: at least one set of output circuits, each of the output circuits including a plurality of the set value output circuits, wherein the same second timing signal is input to the fourth input units of the second output units in the same set.

4. The image forming apparatus of claim 1, wherein one of the plurality of timing signals is a timing signal generated by combining a plurality of different timing signals.

5. A non-transitory computer readable storage medium storing a program causing a computer to perform image formation processing, the image formation processing comprising:

selecting one of a plurality of timing signals that are output in accordance with an image formation operation;

inputting the selected timing signal as a second timing signal to a fourth input unit of a second output unit that includes a third input unit and the fourth input unit;

outputting a signal input to the third input unit, when the second timing signal is input to the fourth input unit;

continuing the outputting of the second output unit until a next second timing signal is input to the fourth input unit;

inputting a first timing signal to a second input unit of a first output unit that includes the first input unit and the second input unit, so that a set value for an image to be formed next is output during the image formation using the signal output from the second output unit;

sequentially inputting a signal to the first input unit, the signal indicating a set value for forming an image based on image data;

outputting the signal input to the first input unit, when the first timing signal is input to the second input unit; and continuing the outputting of the first output unit until a next first timing signal is input to the second input unit.

6. The non-transitory computer readable storage medium of claim 5, wherein the image forming processing further comprises, when at least one set of output circuits each including a plurality of pairs of the first and second output units is provided, inputting the same second timing signal to the fourth input units of the second output units in the same set.

7. The non-transitory computer readable storage medium of claim 5, wherein one of the plurality of timing signals is a timing signal generated by combining a plurality of different timing signals.

8. An image forming method comprising:

selecting one of a plurality of timing signals that are output in accordance with an image formation operation;

inputting the selected timing signal as a second timing signal to a fourth input unit of a second output unit that includes a third input unit and the fourth input unit;

outputting a signal input to the third input unit, when the second timing signal is input to the fourth input unit;

continuing the outputting of the second output unit until a next second timing signal is input to the fourth input unit;

inputting a first timing signal to a second input unit of a first output unit that includes the first input unit and the second input unit, so that a set value for an image to be formed next is output during the image formation using the signal output from the second output unit;

sequentially inputting a signal to the first input unit, the signal indicating a set value for forming an image based on image data;

outputting the signal input to the first input unit, when the first timing signal is input to the second input unit; and continuing the outputting of the first output unit until a next first timing signal is input to the second input unit.

* * * * *